US008634290B2

(12) United States Patent
Ryoo et al.

(10) Patent No.: US 8,634,290 B2
(45) Date of Patent: Jan. 21, 2014

(54) APPARATUS AND METHOD FOR PROTECTION SWITCHING FOR MESH TOPOLGY

(75) Inventors: Jeong Dong Ryoo, Daejeon (KR); Tae Sik Cheung, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 193 days.

(21) Appl. No.: 13/249,723

(22) Filed: Sep. 30, 2011

(65) Prior Publication Data

US 2012/0082026 A1 Apr. 5, 2012

(30) Foreign Application Priority Data

Sep. 30, 2010 (KR) .................. 10-2010-0095282
Sep. 26, 2011 (KR) .................. 10-2011-0096783

(51) Int. Cl.
*G01R 31/08* (2006.01)
(52) U.S. Cl.
USPC .................. 370/220; 398/9; 398/10; 398/12
(58) Field of Classification Search
USPC ............... 370/216–228, 241–253; 398/9–38
See application file for complete search history.

(56) References Cited

U.S. PATENT DOCUMENTS

| 6,952,395 | B1* | 10/2005 | Manoharan et al. .......... 370/219 |
| 2002/0021659 | A1* | 2/2002 | Meijen et al. ................. 370/217 |
| 2004/0085895 | A1* | 5/2004 | Zettinger et al. .............. 370/220 |
| 2004/0208527 | A1* | 10/2004 | Mantin et al. ................... 398/33 |
| 2010/0232287 | A1* | 9/2010 | Long et al. .................... 370/220 |
| 2010/0309777 | A1* | 12/2010 | Kano ............................ 370/218 |
| 2012/0033549 | A1* | 2/2012 | Joshi et al. .................... 370/228 |

* cited by examiner

*Primary Examiner* — Charles C Jiang
(74) *Attorney, Agent, or Firm* — Nelson Mullins Riley & Scarborough LLP

(57) ABSTRACT

Provided are a shared mesh protection switching apparatus and method. The shared mesh protection switching apparatus includes a plurality of linear protection switching processors allocated to the linear protection domains respectively and configured to provide a switching report signal in response to fault occurrence in the corresponding linear protection domains or a linear protection switching operation, and perform a function of limiting use of the shared section in response to a provided lock signal, and a mesh protection switching processor configured to select at least one linear protection domain to be limited in use of the network resources of the shared section according to a predetermined reference when the switching report signal is provided and provide the lock signal to a linear protection switching processor corresponding to the at least one selected linear protection domain.

11 Claims, 4 Drawing Sheets

—— : WORKING PATH
------ : PROTECTION PATH

—— : WORKING PATH
------ : PROTECTION PATH

APPARATUS AND METHOD FOR PROTECTION SWITCHING FOR MESH TOPOLGY

CLAIM FOR PRIORITY

This application claims priority to Korean Patent Applications No. 10-2010-0095282 filed on Sep. 30, 2010 and No. 10-2011-0096783 filed on Sep. 26, 2011 in the Korean Intellectual Property Office (KIPO), the entire contents of which are hereby incorporated by reference.

BACKGROUND

1. Technical Field

Example embodiments of the present invention relate in general to protection switching in a network, and more particularly, to a shared mesh protection switching apparatus and method that can be applied to a network topology environment in which ends of different linear protection paths are disposed at the same node.

2. Related Art

Protection switching is a method for resuming traffic as soon as possible when a network failure stops the traffic. Protection switching can be classified into linear protection switching, ring protection switching, and mesh protection switching according to network topology.

In linear protection switching, a working path and a protection path are set not to intersect for traffic flowing in both directions or in one direction between two points. At normal times, traffic is transferred through the working path, but when a network failure occurs or according to control of an administrator, traffic is transferred through the protection path.

Linear protection switching is performed in one linear protection domain. In other words, in linear protection switching, both ends of traffic and a working path and protection path connecting the ends are defined as one linear protection domain, and messages are exchanged according to a protocol between the ends, so that a protection switching function operates.

Mesh protection switching sets one linear protection domain for each point-to-point (P2P) connection and enables protection paths of a plurality of linear protection domains to share the same network resources when a plurality of P2P connections are established in a mesh topology network.

In other words, countless linear protection domains having different ends are present in a mesh topology network, and mesh protection switching provides a mechanism capable of tuning use of network resources between linear protection domains, so that protection paths of the respective linear protection domains can share the network resources.

FIG. 1 illustrates an example of a general mesh protection switching operation.

Referring to FIG. 1, two linear protection domains are set for two P2P connections (i.e., A-B and C-D) in a mesh topology, respectively. Here, a working path W1 and a protection path P1 (i.e., A-P-Q-B) are for a P2P connection A-B of a first linear protection domain.

On the other hand, a working path W2 and a protection path P2 (i.e., C-P-Q-D) are for a P2P connection C-D of a second linear protection domain.

To enable the two protection paths P1 and P2 to share network resources of a section P-Q between a node P and a node Q, mesh protection switching specifies exchange and processing of protocol messages between the end nodes (i.e., the nodes A, B, C and D) of the connections and the shared nodes (i.e., the nodes P and Q).

In general, existing mesh protection switching as illustrated in FIG. 1 specifies protocol messages required upon a network failure and the resultant process on the assumption that the connection end nodes (i.e., the nodes A, B, C and D) differ from the shared nodes (i.e., the nodes P and Q). However, when a connection end node is a shared node, existing mesh protection switching cannot be applied, and appropriate mesh protection switching for this environment is required.

SUMMARY

Accordingly, example embodiments of the present invention are provided to substantially obviate one or more problems due to limitations and disadvantages of the related art.

Example embodiments of the present invention provide a mesh protection switching apparatus capable of performing protection switching when an end node of a connection is a shared node in a network topology.

Example embodiments of the present invention also provide a mesh protection switching method capable of performing protection switching when an end node of a connection is a shared node in a network topology.

In some example embodiments, a mesh protection switching apparatus performing protection switching in a network environment in which a plurality of linear protection domains share network resources of a shared section for a protection path includes: a plurality of linear protection switching processors allocated to the linear protection domains respectively, and configured to provide a switching report signal in response to fault occurrence in the corresponding linear protection domains or a linear protection switching operation, and perform a function of limiting use of the shared section in response to a provided lock signal; and a mesh protection switching processor configured to select at least one linear protection domain to be limited in use of the network resources of the shared section according to a predetermined reference when the switching report signal is provided, and provide the lock signal to a linear protection switching processor corresponding to the at least one selected linear protection domain.

Among the plurality of linear protection switching processors, the linear protection switching processor receiving the lock signal from the mesh protection switching processor may determine the lock signal as an instruction to limit use of a protection path included in a linear protection domain of the linear protection switching processor itself, and perform a protection path limiting function.

The linear protection switching processor may perform the protection path limiting function using a lockout-of-protection message or lock message as the instruction to limit use of the protection path.

When the switching report signal is provided, the mesh protection switching processor may select the at least one linear protection domain to be limited in use of the network resources of the shared section on the basis of at least one of priority levels or amounts of resource occupation of the respective linear protection domains.

When some of the linear protection domains have the same priority level, the mesh protection switching processor may give a higher priority level to a linear protection domain that has occupied the protection path first.

The mesh protection switching processor may use identifications (IDs) of working paths included in the respective linear protection domains as the priority levels.

In other example embodiments, a shared mesh protection switching method in a network environment in which a plurality of linear protection domains share network resources of a shared section for a protection path includes: selecting a linear protection domain to be limited in use of the network resources of the shared section according to a predetermined reference when a failure or a linear protection switching operation occurs in at least one of the plurality of linear protection domains; and performing, at the selected linear protection domain, a function of limiting use of the shared section.

Selecting the linear protection domain to be limited in use of the network resources of the shared section may include selecting the linear protection domain to be limited in use of the network resources of the shared section on the basis of at least one of priority levels and amounts of resource occupation of the respective linear protection domains.

Selecting the linear protection domain to be limited in use of the network resources of the shared section may further include giving a higher priority level to a linear protection domain that has occupied the protection path first when some of the linear protection domains have the same priority level.

Selecting the linear protection domain to be limited in use of the network resources of the shared section may further include using IDs of working paths included in the respective linear protection domains as the priority levels.

Performing, at the selected linear protection domain, the function of limiting use of the shared section may include performing a function of limiting a protection path included in the shared section using a lockout-of-protection message or lock message.

In the above-described shared mesh protection switching apparatus and method, if an end node of a linear protection path is an end node of shared resources in a network environment in which a plurality of linear protection paths share the same resources, use of a shared section is permitted or limited in consideration of priority levels and resource occupation of linear protection domains using the network resources of the shared section when linear protection switching occurs in a linear protection domain.

Consequently, when an end node of a connection is a shared node, protection switching can be performed, so that network resources can be efficiently utilized.

BRIEF DESCRIPTION OF DRAWINGS

Example embodiments of the present invention will become more apparent by describing in detail example embodiments of the present invention with reference to the accompanying drawings, in which.

Figure 1:
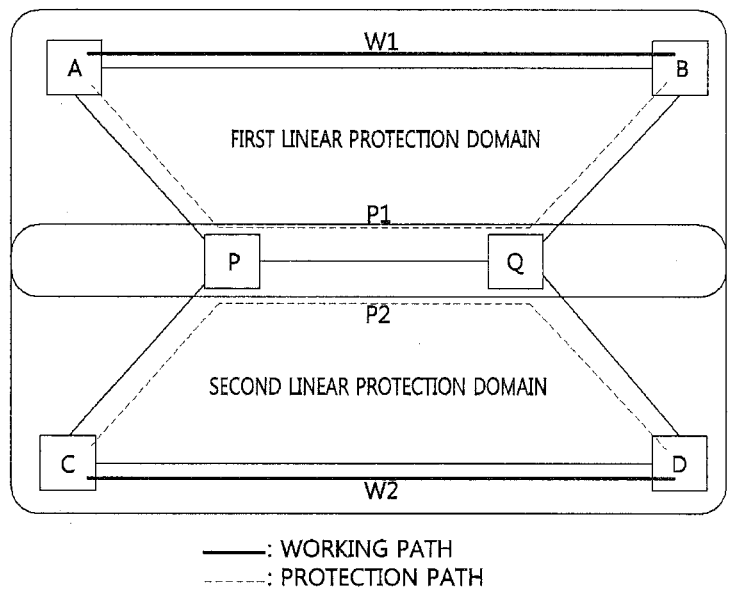
FIG. 1 illustrates an example of a general mesh protection switching operation.

DESCRIPTION OF EXAMPLE EMBODIMENTS
OF THE PRESENT INVENTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, example embodiments of the present invention will be described in detail with reference to the appended drawings. To aid in understanding the present invention, like numbers refer to like elements throughout the description of the figures, and the description of the same component will not be reiterated.

A shared mesh protection switching apparatus and method according to example embodiments of the present invention can be applied regardless of network technology such as Ethernet, provider backbone bridge-traffic engineering (PBB-TE), multi-protocol label switching transport profile (MPLS-TP). For example, in an Ethernet network, the shared mesh protection method according to an example embodiment of the present invention can be applied between linear protection domains defined in international telecommunications union-telecommunications standardization sector (ITU-T) Recommendation G8031, and in a PBB-TE network, between linear protection domains that are defined in institute of electrical and electronics engineers (IEEE) 802.1Qay and consist of point-to-point (P2P) traffic engineered service instances (TESIs). Also, in an MPLS-TP network, a linear protection switching protocol has not yet been determined as a standard, but the shared mesh protection method according to an example embodiment of the present invention can be applied between linear protection domains in which a working path and protection path are present between an end node and each of other end nodes of traffic.

Shared mesh protection according to an example embodiment of the present invention will be described in detail below with reference to appended drawings.

Figure 2:
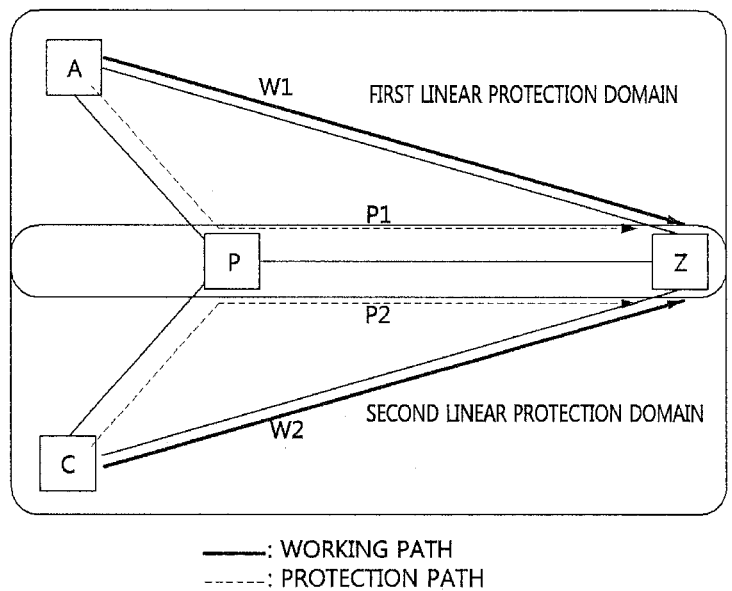
FIG. 2 illustrates an example of an environment and operation to which shared mesh protection switching according to an example embodiment of the present invention is applied.

FIG. 2 illustrates an example of an environment and operation to which shared mesh protection switching according to an example embodiment of the present invention is applied.

In the example of FIG. 2, shared mesh protection switching is applied to a network environment in which a first linear protection domain for a unidirectional P2P connection from a node A to a node Z and a second linear protection domain for a unidirectional P2P connection from a node C to the node Z are set.

In FIG. 2, a working path for the connection from the node A to the node Z is W1 (i.e., A→Z), and a protection path for the connection is P1 (i.e., A→P→Z). On the other hand, a working path for the unidirectional P2P connection from the node C to the node Z is W2 (i.e., C→Z), and a protection path for the connection is P2 (i.e., C→P→Z).

In the network environment shown in FIG. 2, shared mesh protection switching according to an example embodiment of the present invention specifies operation of the node Z that is a connection and shared end node so that the two protection paths P1 and P2 can share network resources of a section between the node P and the node Z (i.e., P→Z).

Figure 3:
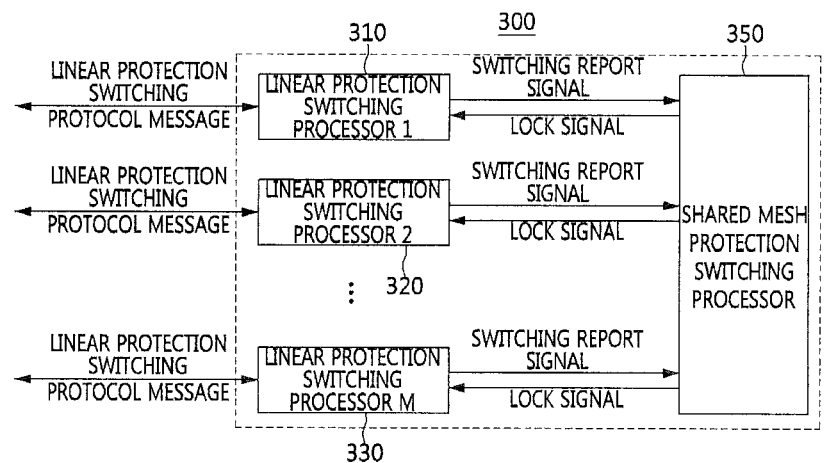
FIG. 3 is a block diagram of a shared mesh protection switching apparatus according to an example embodiment of the present invention.

FIG. 3 is a block diagram of a shared mesh protection switching apparatus according to an example embodiment of the present invention, showing the constitution of a node, such as the node Z shown in FIG. 2, that is a shared node of a connection as well as an end node of the connection.

Referring to FIG. 3, a shared mesh protection switching apparatus 300 according to an example embodiment of the present invention may include a plurality of (e.g., M) linear protection switching processors 310 to 330 operating in a plurality of (e.g., M) linear protection domains respectively, and a shared mesh protection switching processor 350.

Each of the linear protection switching processors 310 to 330 transmits and receives protocol messages relating to conventional linear protection switching, thereby operating according to a conventional linear protection switching method. Additionally, when a switching operation occurs due to a failure occurring in the corresponding linear protection domain or according to an instruction of an administrator, each of the linear protection switching processors 310 to 330 transmits a switching report signal regarding occurrence of the switching operation to the mesh protection switching processor 350.

When a lock signal transferred from the shared mesh protection switching processor 350 is received, each of the linear protection switching processors 310 to 330 regards the received lock signal as an instruction (e.g., lockout of protection) to limit use of a protection path among functions of conventional linear protection switching, and performs the function of limiting a protection path according to a conventional method.

When the switching report signal regarding occurrence of the switching operation caused by a failure in the corresponding linear protection domain or an instruction of the administrator is received from at least one of the plurality of linear protection switching processors 310 to 330, the shared mesh protection switching processor 350 considers a priority level of the corresponding linear protection switching processor that has transferred the signal and a current state of a shared section, and calculates the amount of resources. Thereafter, the shared mesh protection switching processor 350 selects a linear protection domain to be limited in use of the shared section, and transfers the lock signal to a linear protection switching processor corresponding to the selected linear protection domain.

Figure 4A:
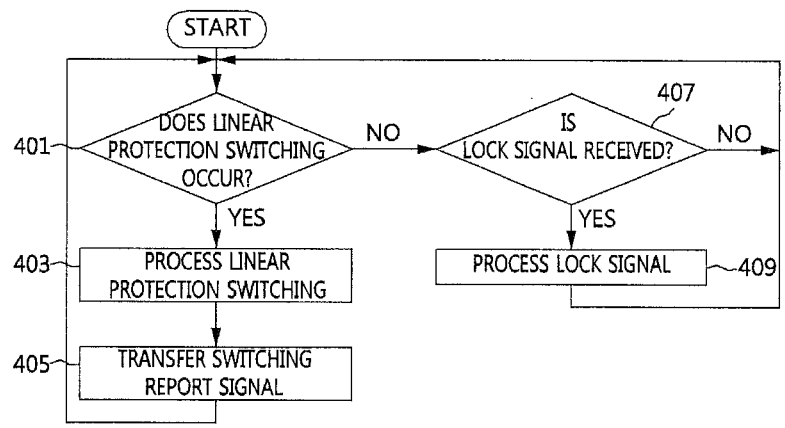
FIG. 4 is a flowchart illustrating a shared mesh protection switching method according to an example embodiment of the present invention.
Figure 4B:
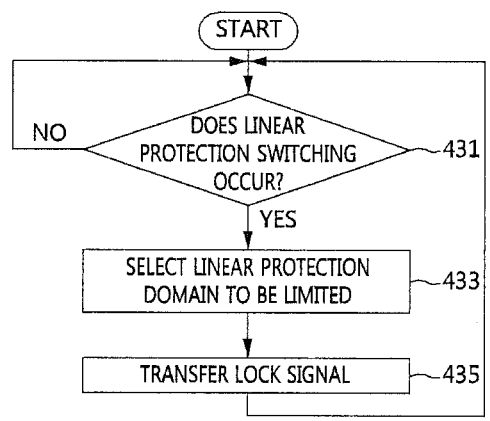

FIG. 4 is a flowchart illustrating a shared mesh protection switching method according to an example embodiment of the present invention. FIG. 4(A) illustrates a process performed by each of the linear protection switching processors shown in FIG. 3, and FIG. 4(B) illustrates a process performed by the shared mesh protection switching processor shown in FIG. 3.

Referring to FIG. 4(A), each linear protection switching processor determines whether or not linear protection switching occurs due to a failure of a linear protection domain or an instruction of an administrator (step 401). When it is determined that linear protection switching occurs, each linear protection switching processor processes linear protection switching according to conventional linear protection switching technology (step 403).

Also, when linear protection switching occurs, each linear protection switching processor transfers a switching report signal reporting that linear protection switching occurs to the shared mesh protection switching processor (step 405). Here, the linear protection switching process step (step 403) and the switching report signal transmission step (step 405) may be performed in the reverse order or at the same time.

Meanwhile, when it is determined in step 401 that linear protection switching does not occur, each linear protection switching processor determines whether a lock signal is provided from the shared mesh protection switching processor (step 407). When it is determined that a lock signal is provided from the shared mesh protection switching processor, each linear protection switching processor executes an instruction (e.g., lockout of protection) to limit transmitting traffic through a protection path among functions of linear protection switching (step 409).

In step 409, each linear protection switching processor may prohibit use of a protection path using a lockout-of-protection message defined in a linear protection switching standard of conventional Ethernet, PBB-TE, and MPLS-TP networks or a lock message defined in an operation, administration, and maintenance (OAM) standard of conventional Ethernet and MPLS-TP networks as the instruction to limit transmitting traffic through a protection path among functions of linear protection switching.

Referring to FIG. 4(B), the shared mesh protection switching processor determines whether a switching report signal is received from at least one of the plurality of linear protection switching processors (step 431). When it is determined that a switching report signal is received from a linear protection switching processor, the shared mesh protection switching processor compares priority levels and amounts of resource occupation of linear protection domains using network resources of a shared section with a priority level and an amount of required resources of the linear protection domain that has transferred the a resource occupation state and the switching report signal, and selects at least one linear protection domain that needs to be limited in use of network resources of the shared section (step 433). Here, when some linear protection domains have the same priority levels, a higher priority level may be given to a linear protection domain that has occupied a protection path first.

In ITU-T Recommendation G.808.1, working paths are identified by numbers from 1 to 255 in linear protection domains, and the numbers may be used as priority level information for shared mesh protection switching according to an example embodiment of the present invention. Alternatively, when working path identifiers are provided in specific technology such as Ethernet, MPLS-TP, and PBB-TE, the working path identifiers can also be used. Also, when different priority levels are given to respective linear protection domains having the same identifier, the path identifier and the priority levels may be arbitrarily mapped to the respective linear protection domains.

Subsequently, the shared mesh protection switching processor transmits a lock signal to a linear protection switching processor corresponding to the at least one linear protection domain selected in step 433 (step 435).

Figure 5:
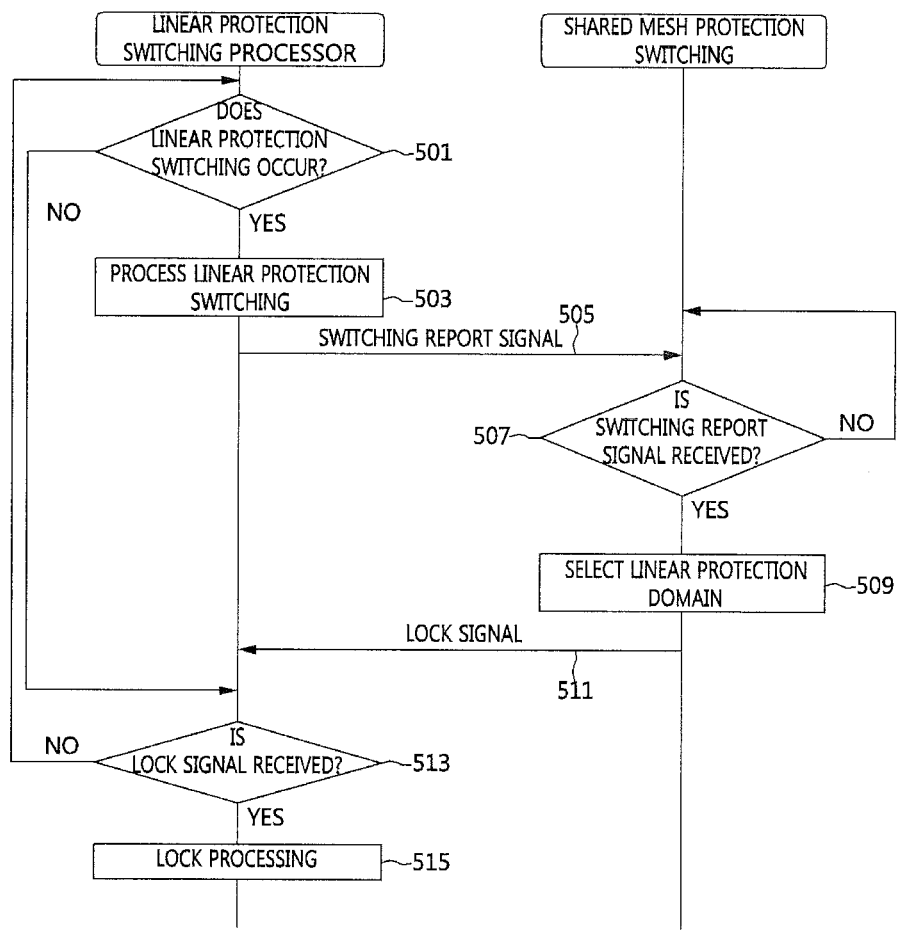
FIG. 5 is a flowchart illustrating a shared mesh protection switching method according another example embodiment of the present invention.

FIG. 5 is a flowchart illustrating a shared mesh protection switching method according to another example embodiment of the present invention, that is, mutual operations of a specific one of the linear protection switching processors shown in FIG. 3 and the shared mesh protection switching processor.

Referring to FIG. 5, each linear protection switching processor determines whether linear protection switching occurs (step 501). When linear protection switching occurs, each linear protection switching processor performs a linear protection switching process according to conventional linear protection switching technology (step 503). Also, when linear protection switching occurs, each linear protection switching processor transfers a switching report signal reporting that linear protection switching occurs to the shared mesh protection switching processor (step 505). Here, step 503 and step 505 may be performed in the reverse order or at the same time.

The shared mesh protection switching processor determines whether a switching report signal is received from a linear protection switching processor (step 507). When a switching report signal is received, the shared mesh protection switching processor compares priority levels and a resource occupation state of linear protection domains using network resources of a shared section with a priority level and an amount of required resources of the linear protection domain that has transferred the switching report signal, thereby selecting a linear protection domain that needs to be limited in use of the network resources of the shared section (step 509).

Subsequently, the shared mesh protection switching processor transfers a lock signal to a linear protection switching processor corresponding to the selected linear protection domain (step 511).

Each linear protection switching processor determines whether the lock signal is provided from the shared mesh protection switching processor (step 513). When the lock signal is provided, each linear protection switching processor executes an instruction to limit transmitting traffic through a protection path among functions of linear protection switching (step 515).

Figure 6:
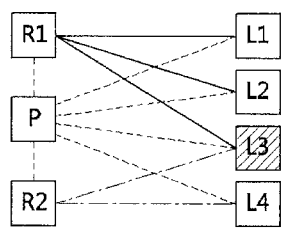
FIG. 6 illustrates another example to which a shared mesh protection apparatus and method according to an example embodiment of the present invention can be applied.

FIG. 6 illustrates another example to which a shared mesh protection apparatus and method according to an example embodiment of the present invention can be applied.

In the example of FIG. 6, a shared mesh protection apparatus and method according to an example embodiment of the present invention may be applied to a case in which leaf nodes of a plurality of point-to-multipoint connections are connected to the same node in a point-to-multipoint connection environment, that is, a network connection environment in which the same traffic generated from one node (e.g., a root node) is transferred to a plurality of nodes (e.g., leaf nodes).

To be specific, the example of FIG. 6 illustrates the configuration of a point-to-multipoint connection from a root node R1 to leaf nodes L1, L2 and L3, and the configuration of a point-to-multipoint connection from a root node R2 to leaf nodes L3 and L4.

In the point-to-multipoint connection from the root node R1 to the leaf nodes L1, L2 and L3, a protection path for a connection (R1, L1) is (R1, P, L1), a protection path for a connection (R1, L2) is (R1, P, L2), and a protection path for a connection (R1, L3) is (R1, P, L3).

Likewise, in the point-to-multipoint connection from the root node R2 to the leaf nodes L3 and L4, a protection path for a connection (R2, L3) is (R2, P, L3), and a protection path for a connection (R2, L4) is (R2, P, L4).

Here, a section between the node P and the node L3 is shared by two protection paths, that is, (R1, P, L3) and (R2, P, L3). When a shared mesh protection switching apparatus according to an example embodiment of the present invention is applied to the node L3, the two point-to-multipoint connections share the section between the node P and the node L3, so that network resources can be efficiently utilized.

While the example embodiments of the present invention and their advantages have been described in detail, it should be understood that various changes, substitutions and alterations may be made herein without departing from the scope of the invention.

What is claimed is:

1. A mesh protection switching apparatus performing protection switching in a network environment in which a plurality of linear protection domains share network resources of a shared section for a protection path, the apparatus comprising:

a plurality of linear protection switching processors allocated to the linear protection domains respectively, and configured to provide a switching report signal in response to fault occurrence in the corresponding linear protection domains or a linear protection switching operation, and perform a function of limiting use of the shared section in response to a provided lock signal; and a mesh protection switching processor configured to select at least one linear protection domain to be limited in use of the network resources of the shared section according to a predetermined reference when the switching report signal is provided, and provide the lock signal to a linear protection switching processor corresponding to the at least one selected linear protection domain.

2. The mesh protection switching apparatus of claim 1, wherein, among the plurality of linear protection switching processors, the linear protection switching processor receiving the lock signal from the mesh protection switching processor determines the lock signal as an instruction to limit use of a protection path included in a linear protection domain of the linear protection switching processor itself, and performs a protection path limiting function.

3. The mesh protection switching apparatus of claim 2, wherein the linear protection switching processor performs the protection path limiting function using a lockout-of-protection message or lock message as the instruction to limit use of the protection path.

4. The mesh protection switching apparatus of claim 1, wherein, when the switching report signal is provided, the mesh protection switching processor selects the at least one linear protection domain to be limited in use of the network resources of the shared section on the basis of at least one of priority levels or amounts of resource occupation of the respective linear protection domains.

5. The mesh protection switching apparatus of claim 4, wherein, when some of the linear protection domains have the same priority level, the mesh protection switching processor gives a higher priority level to a linear protection domain that has occupied the protection path first.

6. The mesh protection switching apparatus of claim 4, wherein the mesh protection switching processor uses identifications (IDs) of working paths included in the respective linear protection domains as the priority levels.

7. A shared mesh protection switching method in a network environment in which a plurality of linear protection domains share network resources of a shared section for a protection path, the method comprising:
   providing a switching report signal, by one of a group of linear protection switching processors, allocated to the linear protection domains respectively, in response to fault occurrence in the corresponding linear protection domains or a linear protection switching operation;
   selecting, by a mesh protection switching processor, a linear protection domain to be limited in use of the network resources of the shared section according to a predetermined reference when the switching report signal is provided;
   providing a lock signal, by the mesh protection switching processor, to a linear protection switching processor corresponding to the at least one selected linear protection domain; and
   performing, by the one of the linear protection switching processors, at the selected linear protection domain, a function of limiting use of the shared section in response to the provided lock signal.

8. The shared mesh protection switching method of claim 7, wherein selecting the linear protection domain to be limited in use of the network resources of the shared section includes selecting the linear protection domain to be limited in use of the network resources of the shared section on the basis of at least one of priority levels and amounts of resource occupation of the respective linear protection domains.

9. The shared mesh protection switching method of claim 8, wherein selecting the linear protection domain to be limited in use of the network resources of the shared section further includes giving a higher priority level to a linear protection domain that has occupied the protection path first when some of the linear protection domains have the same priority level.

10. The shared mesh protection switching method of claim 8, wherein selecting the linear protection domain to be limited in use of the network resources of the shared section further includes using identifications (IDs) of working paths included in the respective linear protection domains as the priority levels.

11. The shared mesh protection switching method of claim 7, wherein performing, at the selected linear protection domain, the function of limiting use of the shared section includes performing a function of limiting a protection path included in the shared section to limit use of the shared section using a lockout-of-protection message or lock message.

* * * * *